（12）United States Patent
Smeets (10) Patent No.: US 6,813,625 B2
(45) Date of Patent: *Nov. 2, 2004

(54) METHOD AND DEVICE FOR SELF-CLOCK CONTROLLED PSEUDO RANDOM NOISE (PN) SEQUENCE GENERATION

(75) Inventor: Ben Smeets, Dalby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 426 days.

This patent is subject to a terminal disclaimer.

(21) Appl. No.: 09/742,878

(22) Filed: Dec. 20, 2000

(65) Prior Publication Data

US 2002/0016805 A1 Feb. 7, 2002

(30) Foreign Application Priority Data

Dec. 22, 1999 (EP) .............................................. 99610080

(51) Int. Cl.[7] .............................................. G06F 1/02
(52) U.S. Cl. ...................................... 708/250; 708/253
(58) Field of Search ................................ 708/250–256; 380/44, 50; 375/259, 377

(56) References Cited

U.S. PATENT DOCUMENTS

| 4,032,763 A | | 6/1977 | Glitz | |
|---|---|---|---|---|
| 4,225,935 A | | 9/1980 | Zscheile, Jr. et al. | |
| 4,817,145 A | | 3/1989 | Günther | |
| 5,268,949 A | * | 12/1993 | Watanabe et al. | 377/33 |
| 6,148,053 A | * | 11/2000 | Ozluturk | 375/377 |
| 6,201,829 B1 | * | 3/2001 | Schneider | 375/221 |

* cited by examiner

Primary Examiner—Chuong Dinh Ngo
(74) Attorney, Agent, or Firm—Jenkens & Gilchrist, P.C.

(57) ABSTRACT

A method and device for use, e.g., in a mobile telephone, for self-clocked controlled pseudo random noise (PN) sequence generation comprises a plurality of sequence generator units for outputting a plurality of sequence values ($Z_t$) on the basis of a plurality of clock values ($C_t$), and step pattern generators for selecting a step pattern, comprising said plurality of clock values ($C_t$), from a plurality of possible step patterns on the basis of a step pattern select signal ($W_t$). Thus, a flexible and efficient self-clocked controlled pseudo random noise (PN) sequence generation is obtained.

16 Claims, 6 Drawing Sheets

METHOD AND DEVICE FOR SELF-CLOCK CONTROLLED PSEUDO RANDOM NOISE (PN) SEQUENCE GENERATION

FIELD OF THE INVENTION

The present invention relates to an electrical device for self-clocked controlled pseudo random noise (PN) sequence generation.

BACKGROUND OF THE INVENTION

Pseudo random noise sequences (PN sequences) are used in many cryptographic and communication applications to provide randomly appearing symbols. Typically, cryptographic applications are methods to provide confidentiality of transmitted information through the use of stream ciphers. In communications systems PN sequences may e.g. be used as spreading sequences in spread-spectrum communications systems where they determine the hop sequence and/or the direct spreading sequence.

In general, a receiver of a spread-spectrum communications system will receive a digital signal/bit stream transmitted over a single carrier frequency which is combined from a digital signal/bit stream containing information such as a digitized voice and from a PN sequence used to code or encrypt the transmission. Typically, the length of the PN sequence stream is much larger than the length of the information stream.

The PN sequences are sometimes derived by using a maximal length polynomial. Constructions, whether hardware or software implemented, which form PN sequences in this manner are sometimes referred to as m-sequence generators. It is well known that the randomness properties of the sequences generated by the m-sequence generators are very limited as a result of linear relationships between the symbols of the sequence. This enables a prediction of the next symbol given sufficiently many, but small number of previous symbols. In various applications this is not desirable and, hence, there is a need for efficient techniques to enhance the unpredictability.

Clock control of the m-sequence generator is a well-known method that can be used to increase the unpredictability of m-sequence generators.

In most cryptographic applications the outputs of several such clock controlled m-sequence generators are combined to generate the final output sequence. Output bits generated by a combination of clock controlled m-sequence generators form the PN sequence which are used to e.g. encrypt or spread an information signal.

In known applications, e.g. in the ciphering generator A5/1 of the GSM cellular mobile telephone system, the clocking signals for controlling the stepping of the involved clocked m-sequence generators are derived from signals of the clocked m-sequence generators themselves, i.e. the generators are self-clocked.

The A5/1 generator will be described in more detail in connection with FIG. 1, which shows a schematic block diagram of the A5/1 generator.

In the A5/1 generator, three signals (101) are taken from three feedback registers (104) and combined by mapping means (102) in such a way as to derive three clock control signals (103) so that at least two feedback shift registers (104) and sometimes three are always stepped.

There are eight possible values for the combination of input signals (101) which are mapped to the four possible stepping patterns (0,1,1), (1,0,1), (1,1,0), and (1,1,1) (103) if at least two registers are to be stepped. Here (x,y,z) means that if x is 0, the first feedback register is not stepped, and if x is 1, the first feedback register is stepped. In the same way, y and z control the second and third feedback registers, respectively.

Since each feedback shift register (104) is stepped at least three times out of the four possible stepping patterns (102), each shift register (104) is stepped six times out of the eight possible combinations of the input signals (101), since these eight combinations are mapped to the four stepping patterns (103).

Such a uniformity of stepping each shift register (104), responsible for clocking/controlling the connected m-sequence generators (not shown), has an enhancing effect on the unpredictability of the final output PN sequence combined from the output of the m-sequence generators.

However, it is very hard in general to realise such a favourable clocking mechanism with presently known techniques, as e.g. used in A5/1, for other self-clocking methods and/or schemes; especially for methods using a higher number of shift registers (and thereby more m-sequence generators), which is needed e.g. for a higher degree of unpredictability.

Another problem with the prior art as described above is if e.g. four m-sequence generators (and thereby four shift registers) are needed e.g. for a higher degree of unpredictability, and only two shift registers are to be stepped at a time, 16 combinations of input values must be mapped to the 6 possible step patterns (0,0,1,1), (0,1,0,1), (1,0,0,1), (0,1,1,0), (1,0,1,0), (1,1,0,0). With presently known techniques some step patterns will be used more often since the 16 combinations are mapped to only 6 step patterns.

Further U.S. Pat. No. 4,817,145 discloses a generator for generating pseudo random binary cipher sequences comprising a number of subgenerators arranged in a cascaded scheme. A first subgenerator clocks/steps the other subgenerators and is always clocked itself by an external clock at a constant rate.

Even though this prior generator enhances the randomness of the output sequence it is relatively easier to cryptoanalyse since one part of the generator behaves regularly.

SUMMARY OF THE INVENTION

An object of the invention is to provide an electrical device for self clocked controlled PN sequence generation where a plurality of PN sequence generators are clocked uniformly with respect to the combinations of input signals.

Another object is to provide flexibility with respect to implementing clock control, so that more freedom with respect to step patterns is possible/available.

This object is achieved by an electrical device of the aforementioned type further comprising:
  step pattern generation means adapted to select a step pattern, providing said plurality of clock values ($C_i$), from a plurality of possible step patterns on the basis of a step pattern select signal ($W_t$).

Hereby, a final output PN sequence generation will have an enhanced degree of unpredictability since the generation means are clocked uniformly.

Additionally, the uniformity is obtained on the basis of a step pattern select signal ($W_t$) without using shift registers, which enhances the flexibility of the device, since the step pattern select signal ($W_t$), responsible for controlling/ clocking the sequence generation means, may be obtained by various combinations of different signals instead of mapping means in combination with shift registers.

The enhanced unpredictability and uniformity may be obtained for any number of sequence generation means and any number of stepping patterns.

If the step pattern select signal ($W_t$) is derived on the basis of a combined value ($U_t$) and one or more previously derived step pattern select signals ($W_{t-1}$), a very simple and unpredictable way of deriving the step pattern select signal ($W_t$) is obtained.

Additionally, the step pattern select signal ($W_t$) may be provided by using little additional hardware.

In an alternative embodiment, the plurality of sequence generation means (201) is further adapted to output a plurality of step control values ($u_t$), and the combined value ($U_t$) is provided on the basis of the plurality of step control values ($u_t$) and on the basis of a plurality of prior clock values ($C_{t-1}$).

Hereby, an efficient and simple use of existing signals is obtained.

A simple way of calculating a step pattern select signal ($W_t$) is obtained, if the number of the plurality of possible step patterns is 6, and the pattern select signal ($W_t$) is derived as: $U_t + W_{t-1}$ MOD 6.

In this way a very simple way of calculating the step pattern select signal ($W_t$) is obtained by using existing signals, while still obtaining uniformity with respect to the clocking of the sequence generation means.

For another number of possible step patterns than 6 other modulo functions may be applied, e.g. MOD 4 for four possible step patterns.

Alternatively, if the number of the plurality of possible step patterns is 6, and the pattern select signal ($W_t$) is derived as: $U_t + a_1 W_{t-1} + a_2 W_{t-2} + a_3 W_{t-3}$ MOD 6, where $a_1$, $a_2$ and $a_3$ are preselected constants, an even better, i.e., resulting in a more unpredictable output PN sequence, way of computing the pattern select signal ($W_t$) is obtained.

Alternatively, if the number of the plurality of possible step patterns is not a prime number, then the pattern select signal ($W_t$) is derived on the basis of the combined value ($U_t$) and the previously derived step pattern select signals ($W_{t-1}$) using a Chinese remaindering technique.

In this way a very efficient calculation of the pattern select signal ($W_t$) is obtained, since some calculations of the MOD function may be executed simultaneously.

Another object of the invention is to provide an electrical device comprising a plurality of stepping patterns which reduces power consumption.

This is obtained by choosing the plurality of possible patterns to be: (0,0,1,1), (0,1,0,1), (1,0,0,1), (0,1,1,0), (1,0,1,0), (1,1,0,0).

In this way only two generators are clocked at a time, thereby reducing the power needed.

Additionally, the total power consumption of the total electrical device is independent of the specific stepping pattern used.

In a preferred embodiment, the device further comprises a function generating means (203) adapted to calculate an output value ($Out_t$) as the sum of the plurality of sequence values ($z_t$) MOD 2.

In a preferred embodiment, the plurality of sequence generation means are m-sequence generators.

A further object of the invention is to provide a method of self-clocked controlled PN sequence generation where the PN sequence generators are clocked uniformly with respect to the combinations of input signals.

Another object is to provide flexibility with respect to implementing clock control, so that more freedom with respect to step patterns is possible/available.

This object is achieved by said method of the aforementioned type further comprising the step of:

selecting a step pattern, providing said plurality of clock values ($C_t$), from a plurality of possible step patterns on the basis of a step pattern select signal ($W_t$).

Hereby, a final output PN sequence generation will have an enhanced degree of unpredictability since the generation means/generators are clocked uniformly.

Additionally, the uniformity is obtained on the basis of a step pattern select signal ($W_t$) without using shift registers, which enhances the flexibility of the method, since the step pattern select signal ($W_t$) may be obtained in many different ways by various combinations of different signals and/or values instead of mapping means in combination with shift registers.

In a preferred embodiment, the step pattern select signal ($W_t$) is derived on the basis of a combined value ($U_t$) and one or more previously derived step pattern select signals ($W_{t-1}$).

Hereby, a very simple way of deriving the step pattern select signal ($W_t$) is obtained.

Additionally, the step pattern select signal ($W_t$) may be calculated by using little computational time/complexity.

In yet another embodiment, a plurality of step control values ($u_t$) is output, and said combined value ($U_t$) is provided on the basis of said plurality of step control values ($u_t$) and on the basis of a plurality of prior clock values ($C_{t-1}$).

Hereby, an efficient and simple use of existing values is obtained.

In one embodiment, the number of said plurality of possible step patterns is 6, and said pattern select signal ($W_t$) is derived as: $U_t + W_{t-1}$ MOD 6.

In another embodiment, the number of said plurality of possible step patterns is 6, and said pattern select signal ($W_t$) is derived as: $U_t + a_1 W_{t-1} + a_2 W_{t-2} + a_3 W_{t-3}$ MOD 6, where $a_1$, $a_2$, and $a_3$ are pre-selected constants.

In yet another embodiment, said pattern select signal ($W_t$) is derived on the basis of said combined value ($U_t$) and said previously derived step pattern select signals ($W_{t-1}$) using a Chinese remaindering technique, if the number of said plurality of possible step patterns is not a prime number.

Another object of the invention is to provide a method comprising a stepping pattern which reduces computational complexity even further.

This is obtained when the plurality of possible step patterns is: (0,0,1,1), (0,1,0,1), (1,0,0,1), (0,1,1,0), (1,0,1,0), (1,1,0,0).

In one embodiment, said method further comprises the step of calculating a value ($Out_t$) as the sum of said plurality of sequence values ($Z_t$) MOD 2.

In another embodiment, said plurality of sequence values ($Z_t$) is generated by a plurality of m-sequence generators, e.g. implemented in software.

The present invention also relates to the use of the method and/or electrical device mentioned above in a portable device. In a preferred embodiment the portable device is a mobile telephone.

Hereby, efficient and more safe encryption of digitized speech or other kind of digital information may be obtained.

Additionally, since only two sequence generation means are clocked at a time, electrical power is saved which is especially important in e.g. a mobile telephone.

BRIEF DESCRIPTION OF THE DRAWINGS

The present invention will now be described more fully with reference to the drawings, in which.

DETAILED DESCRIPTION OF PREFERRED EMBODIMENTS

In the following m-sequence generators are described as an example of a PN sequence generator, but other types of PN sequence generators might be just as applicable.

Figure 1:
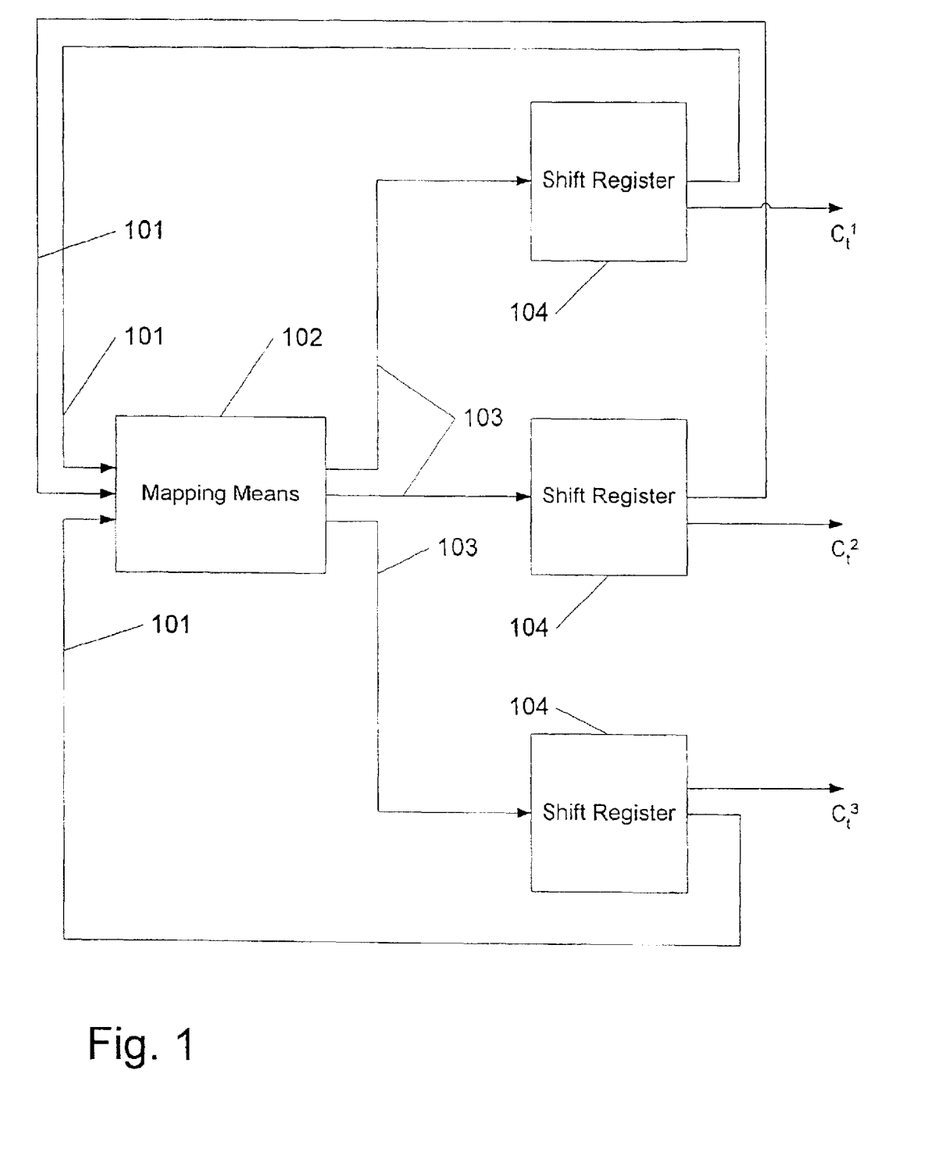
FIG. 1 shows a schematical block diagram of a prior art generator.

FIG. 1 shows a schematic block diagram of a prior art generator. This figure has already been explained above.

Figure 2:
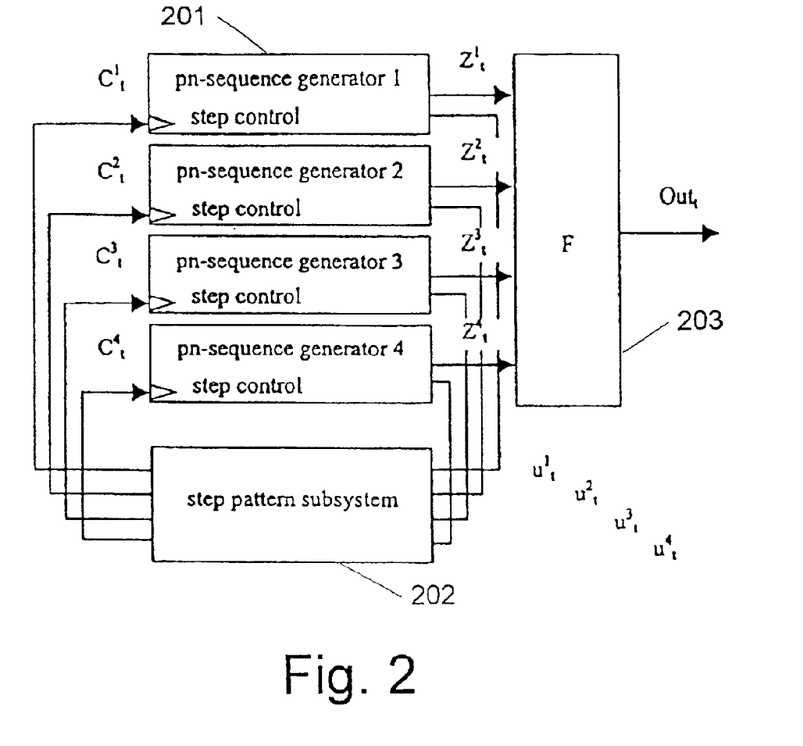
FIG. 2 shows four clock controlled PN sequence generators generating an output PN sequence according to the invention.

FIG. 2 shows four clock controlled PN sequence generators/generation means (201) generating an output PN sequence according to the invention. Preferably, the sequence generation means (201) are m-sequence generators.

The clocking of each generator (201) is controlled by a sequence $C^k = C^k_0, C^k_1, C^k_2, \ldots$, of symbols each representing the value 0 or 1, i.e. $C^k_t \in \{0,1\}$ where t denotes the time instants 0, 1, 2, ... and k denotes the index of the generators (201), i.e. 1, 2, 3, and 4 in this example. The sequence $C^k_t$ is denoted clock signal which consists of clock values forming the sequence.

If the k'th m-sequence generator (201) steps once every time instant, the generator (201) will produce the simple sequence $X^k = X^k_0, X^k_1, X^k_2, X^k_3, \ldots$. If the stepping is controlled by the values of the symbols of $C^k$, the following output sequence $Z^k = Z^k_0, Z^k_1, Z^k_2, Z^k_3, \ldots$, will be produced:

$$Z^k_t = X^k_{\sigma(k,t)} \quad t=0, 1, 2, 3, \ldots,$$

where $$\sigma(k,t) = \Sigma_i C^k_i \quad C^k_i \in \{1,2\},$$

and the sum $\Sigma$ goes from i=0 to i=t−1 and k=1, 2, 3, 4. In other words, the next symbol $Z^k_j$ is equal to either the next symbol $X^k_m$ (if $C^k_t=1$) or the next symbol again $X^k_{m+1}$ (if $C^k_t=2$). As an example, the sequence $Z^k_0 = X^k_0$, $Z^k_1 = X^k_2$, $Z^k_2 = X^k_4$, $Z^k_3 = X^k_5$ will be output if $C^k_0 = 1$ or 2 (does not matter), $C^k_1 = 2$, $C^k_2 = 2$, $C^k_3 = 1$.

The four output sequences $Z^1, Z^2, Z^3, Z^4$ are combined by function generation means (203) which applies a given function F to the sequences $Z^1, Z^2, Z^3, Z^4$ in order to obtain one single output sequence Out=$Out_0, Out_1, Out_2, Out_3, \ldots$ As an example, F may be:

$$F: \{0,1\}^4 \longrightarrow \{0,1\},$$
$$(Z^1_t, Z^2_t, Z^3_t, Z^4_t) \longrightarrow (Z^1_t + Z^2_t + Z^3_t + Z^4_t) \text{ MOD } 2.$$

Hereby, one single PN sequence is obtained and used as output sequence arising from a combination of the four single PN sequences, thereby enhancing the unpredictability even further.

Alternatively, other kinds of functions may be applied instead of the above one, e.g. a simple way of selecting one of the single PN sequences.

The clocking signals $C^1_t, C^2_t, C^3_t, C^4_t$, responsible for controlling the generators (201), form the step pattern ($C^1_t, C^2_t, C^3_t, C^4_t$) for each time instant. The clocking signals are derived by a step pattern subsystem (202) which receives a step control signal ($u^k_t$) from each generator (201).

The step control signal ($u^k_t$) preferably depends on the clocking signal ($C^k_t$).

The step pattern subsystem/step pattern generation means (202) will be described in detail in connection with FIG. 3.

The number of generators that may be used in connection with the present invention may be any number, and four just serves as an example.

Figure 3:
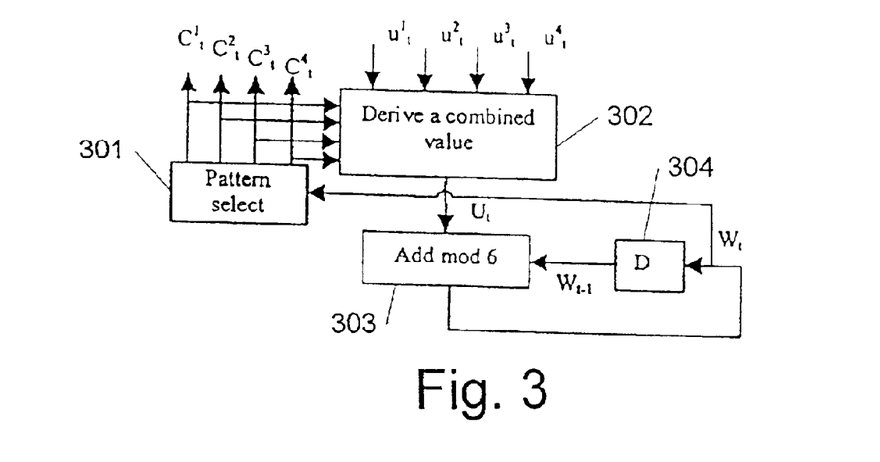
FIG. 3 shows a step pattern subsystem according to one embodiment of the invention.

FIG. 3 shows a step pattern subsystem (202) according to one embodiment of the invention. The implementation shown in FIG. 3 is only one possible implementation of the step pattern subsystem (202).

The subsystem (202), also denoted step pattern generation means, receives four step control values $u^1_t, u^2_t, u^3_t, u^4_t$ at each time instant. The step control values together with the clocking signals $C^1_t, C^2_t, C^3_t, C^4_t$, are used to obtain a single combined value $U_t$ by the combination means (302). The combined value ($U_t$) denotes a value in the range 0, 1, 2, 3.

Preferably, the following 6 possible stepping patterns are chosen: (0,0,1,1), (0,1,0,1), (1,0,0,1), (0,1,1,0), (1,0,1,0), (1,1,0,0).

These 6 stepping patterns have the advantages of stepping the four connected generators (201) uniformly, thereby enhancing the unpredictability, since no single generator (201) is stepped more often than others on average.

Another advantage is that only two generators (201) are stepped at the same time, thereby reducing the power consumption in the electrical device, which is an advantage especially in portable devices like mobile telephones which have a limited power source.

These 6 possible stepping patterns are just an example and any number or combination is applicable.

Preferably, $U_t$ is derived in the following way dependent on the value of the previous $C_t$:

| $C_t$ | $U_t$ |
| --- | --- |
| (0, 0, 1, 1) | $2 u^4_t + u^3_t$ |
| (0, 1, 0, 1) | $2 u^4_t + u^2_t$ |
| (1, 0, 0, 1) | $2 u^4_t + u^1_t$ |
| (0, 1, 1, 0) | $2 u^3_t + u^2_t$ |
| (1, 0, 1, 0) | $2 u^3_t + u^1_t$ |
| (1, 1, 0, 0) | $2 u^2_t + u^1_t$ |

Any kind of other relationships may be used to derive the combined value ($U_t$).

A step pattern select signal ($W_t$), responsible for selecting the step pattern being forwarded to the generators (201) in pattern select means (301), is derived based on the combined value ($U_t$) and a previous generated step pattern select signal ($W_{t-1}$). The previous generated step pattern select signal ($W_{t-1}$) is held in a delay element (304).

The derivation of the step pattern select signal ($W_t$) is done in the ADD/MOD means (303), receiving the combined value ($U_t$) and a previous generated step pattern select signal ($W_{t-1}$), in the following way: $W_{t-1} = U_t + W_{t-1}$ MOD 6.

The step pattern select signal ($W_t$) takes a value in the range 0, 1, 2, 3, 4, 5.

In an alternative embodiment, the step pattern select signal ($W_t$) is derived on the basis of the combined value ($U_t$) and a plurality of previously generated step pattern select signal $W_{t-1}$, $W_{t-2}$, $W_{t-3}$, ..., giving even better properties with respect to unpredictability.

For example, the step pattern select signal ($W_t$) may be derived as: $U_t + a_1 W_{t-1} + a_2 W_{t-2} + a_3 W_{t-3}$ MOD 6, where $a_1$, $a_2$, and $a_3$ are pre-selected constants suitable for a given application.

In cases where the number of selectable patterns is not a prime number, the computation of the step pattern select signal ($W_t$) may advantageously be implemented using a Chinese remaindering technique. For the example of 6 possible stepping patterns, the step pattern select signal ($W_t$) can be derived by simultaneously computing:

$$W^1_t = U_t + W^1_{t-1} \text{ MOD } 2, t=0, 1, 2, \ldots$$

$$W^2_t = U_t + W^2_{t-1} \text{ MOD } 3, t=0, 1, 2, \ldots$$

where $W^2_{t-1} = W_{t-1}$ MOD 2 and $W^1_{t-1} = W_{t-1}$ MOD 3, by using 6 prime number factors (6=2×3).

Figure 4:
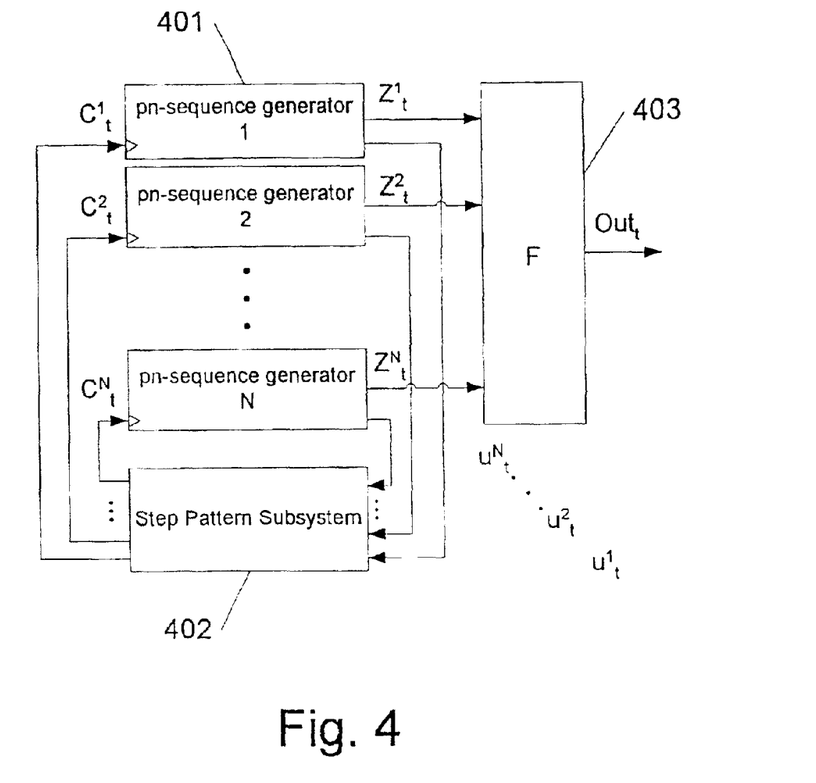
FIG. 4 shows a generalized embodiment of clock controlled PN sequence generators.

FIG. 4 shows a generalized embodiment of clock controlled PN sequence generators. Shown is a plurality of N pn-sequence generators (201) and a step pattern subsystem (402), which may in functionality correspond to the step pattern system (202) shown in FIG. 2, but adapted to obtain N step control signal ($u_t^1 \ldots u_t^N$) from the N pn-sequence generators (201).

The step pattern subsystem (402) provides the N pn-sequence generators (201) with N clocking signals ($C_t^1 \ldots C_t^N$) responsible for clocking/controlling the pn-sequence generators (201) by applying a functionality e.g. similar to the one explained in connection with FIG. 3.

The generalized step pattern subsystem (402) will be described in connection with FIG. 5.

Also shown is function generation means (403) which applies a given function F to the sequences $Z^1, Z^2, \ldots Z^N$ in order to obtain one single output sequence Out=$Out_0$, $Out_1$, $Out_2$, $Out_3$, ..., e.g. as described in connection with FIG. 2.

Figure 5:
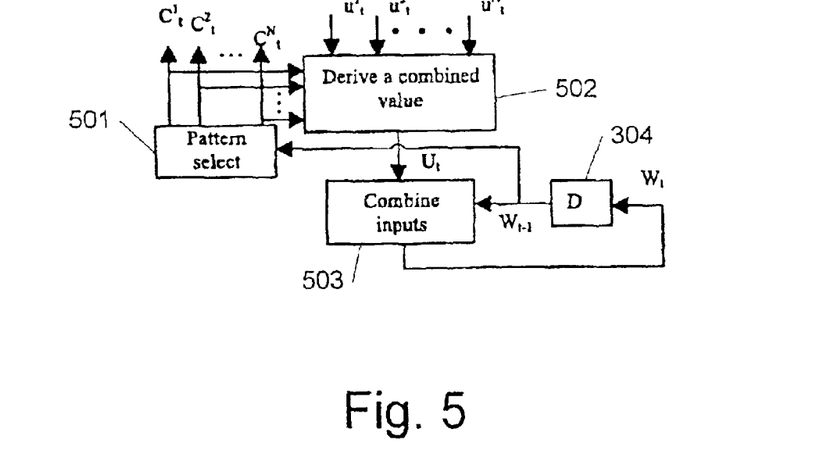
FIG. 5 shows a generalized embodiment of the step pattern subsystem.

FIG. 5 shows a generalized embodiment of the step pattern subsystem. Shown is a step pattern subsystem corresponding to the system (402) in FIG. 4 which selects one step pattern comprising N clocking signals $C_t$ among a plurality of possible step patterns.

The step pattern subsystem receives N step control values $u_t^1, u_t^2, \ldots, u_t^N$ at each time instant from N pn-sequence generators (401), where $u_t^i$ is 0 or 1 in the simplest case for i=1 ... N. The step control values are used together with a previous step pattern/clocking signals $C_t^1, C_t^2, \ldots, C_t^N$ from pattern select means (501) by combination means (502) in order to obtain a single combined value $U_t$.

A step pattern select signal ($W_t$), responsible for selecting the step pattern being forwarded to the generators (401) by the pattern select means (501), is derived based on the combined value ($U_t$) and a previous generated step pattern select signal ($W_{t-1}$). The previous generated step pattern select signal ($W_{t-1}$) is held in a delay element (304).

The derivation of the step pattern select signal ($W_t$) is done in the combine input means (503), receiving the combined value ($U_t$) and a previous generated step pattern select signal ($W_{t-1}$). The derivation of the step pattern select signal ($W_t$) may be realized in many ways depending of a particular implementation of the invention and may e.g. be derived as an addition MOD M, where M is the number of possible step patterns, as described in connection with FIG. 3 (where M=6).

The M step patterns may be chosen as suitable clock patterns of all the possible combinations of subsets containing k elements from a set of N elements. A subset refers to the k pn-sequences generators to be clocked.

In general, for a given k all the values between $K_{min}$ and $K_{max}$, with N≧Kmax≧Kmin≧1, may be chosen, giving $$M = \sum_{k=K_{\min}}^{k=K_{\max}} \frac{N!}{k!(N-k)!}$$

For the embodiments in FIG. 2 and 3 the values was: N=4, k=2, Kmax=Kmin=2.

As mentioned, the embodiments shown in FIG. 2 and 3 is a specialized case of the embodiments shown in FIG. 4 and 5 and many other embodiments may just be as applicable depending on a specific implementation and should not limit the scope of the invention as sought out in the appended claims.

Figure 6:
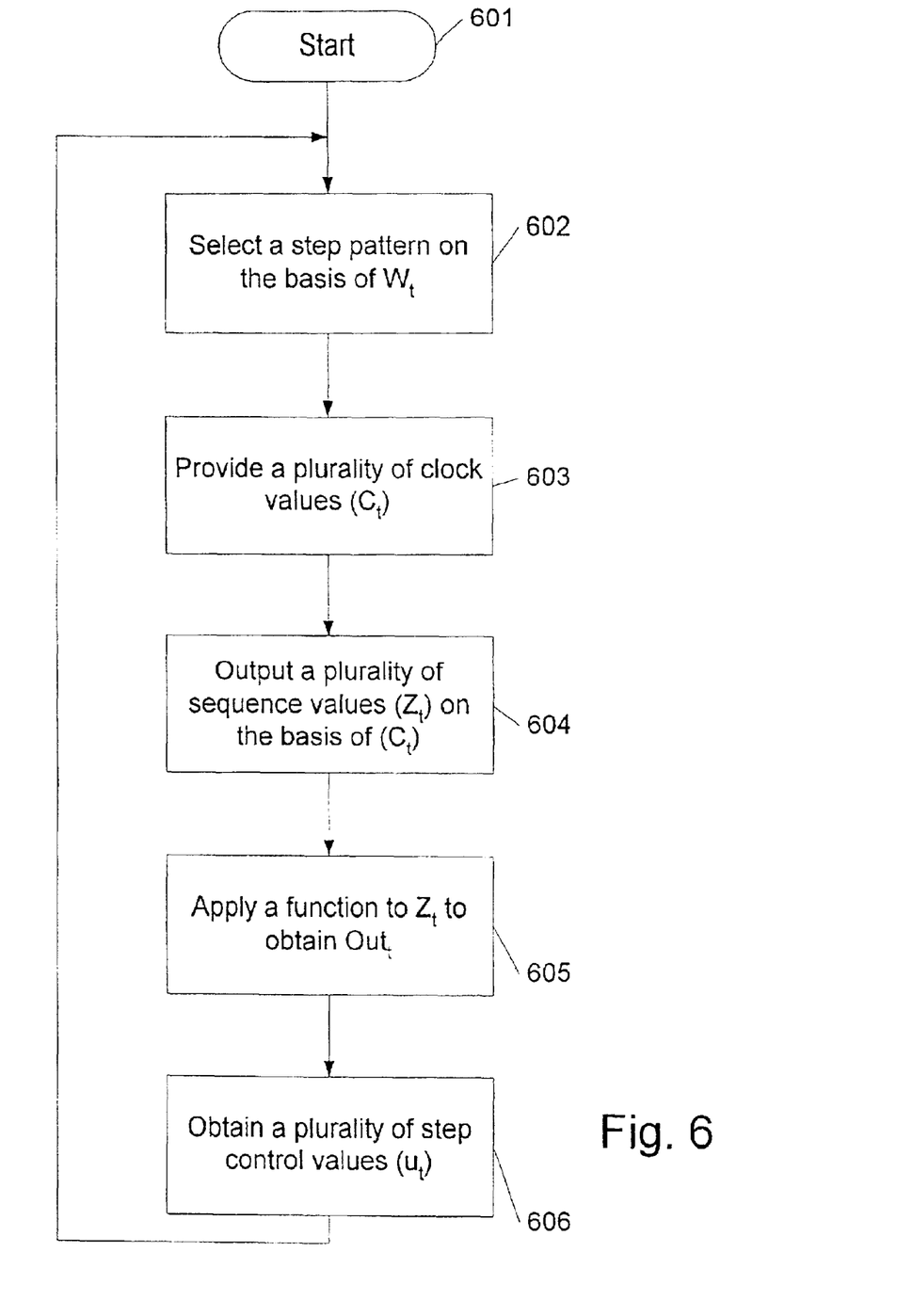
FIG. 6 shows a flow chart of the method according to the invention.

FIG. 6 shows a flow chart of the method according to the invention. The method generates a plurality of PN sequence values/symbols and selects one of these as output. As an example, a method using four generators will be described.

The method is initialised at step (601).

At step (602) one step pattern is selected on the basis of a step pattern select signal ($W_t$) from a plurality of possible step patterns.

The generation of the step pattern select signal ($W_t$) will be described later in connection with step (606).

The step pattern chosen is responsible for controlling the mode according to which the PN sequence generators will generate a output sequence value ($Z_t$), as will be described later.

Preferably, the following 6 possible stepping patterns are chosen: (0,0,1,1), (0,1,0,1), (1,0,0,1), (0,1,1,0), (1,0,1,0), (1,1,0,0).

These 6 possible stepping patterns have the advantage that only two generators is clocked at a time, thereby reducing the computational complexity of the method at a given time instance.

Another advantage is that the 6 possible stepping patterns clock the generators uniformly, thereby enhancing the unpredictability, since no generator is used to output a sequence value more often than the others.

At step (603) a plurality of clock values ($C_t$) is provided to the generators on the basis of the selected step pattern. The step pattern comprises the individual clock values for each generator, e.g. the step pattern (0,0,1,1) will control the two first generators to step once (generate the next symbol) and control the two last generators to step twice (generate the second next symbol).

After receiving the clock values ($C_t$), the generators each generate a PN sequence value according to the received clock value $C_t$ at step (604).

At step (605) a function F is applied to combine the four output sequences $Z^1, Z^2, Z^3, Z^4$ in order to obtain one single output sequence Out=$Out_0$, $Out_1$, $Out_2$, $Out_3$, ....

Preferably, F is defined as:

$$F: \{0,1\}^4 \longrightarrow \{0,1\},$$
$$(Z^1_t, Z^2_t, Z^3_t, Z^4_t) \longrightarrow (Z^1_t + Z^2_t + Z^3_t + Z^4_t) \text{ MOD } 2,$$

where $Z^k_t$ denotes a sequence value ($Z_t$) generated by the k'th generator.

In this way, a single sequence value (Out$_t$) is obtained which relates to all the generated sequence values ($Z_t$), thereby enhancing the unpredictability of the output sequence (Out$_t$) even further.

Other functions than the one described above may be applied just as well.

At step (606) a plurality of step control values ($u_t$) is provided from the plurality of generators. These step control values ($u_t$) together with the clock values ($C_t$) are used to derive a combined value ($U_t$) which is used to calculate the step pattern select signal ($W_t$) as described in connection with the device according to the invention.

Preferably, the generators are standard m-sequence generators, e.g. implemented in software, but other types of PN sequence generators may be used instead.

Alternatively, some of the steps may be executed simultaneously, e.g. the steps (603) and (606).

Figure 7:
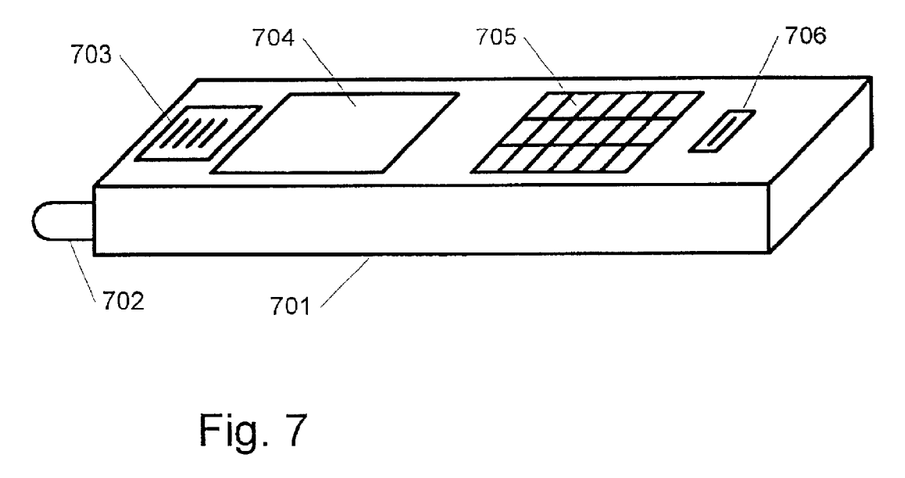
FIG. 7 shows the preferred embodiment of the invention, which may contain the electrical device and/or use the method according to the present invention.

FIG. 7 shows a preferred embodiment of the invention, which may contain the electrical device and/or use the method according to the present invention. Shown is a mobile telephone (701) having display means (704), a keypad (705), an antenna (702), a microphone (706), and a speaker (703). By including the electrical device and/or the method according to the present invention a safer encryption of speech signal is provided, just requiring very little additional hardware and/or additional computational effort.

Figure 8A:
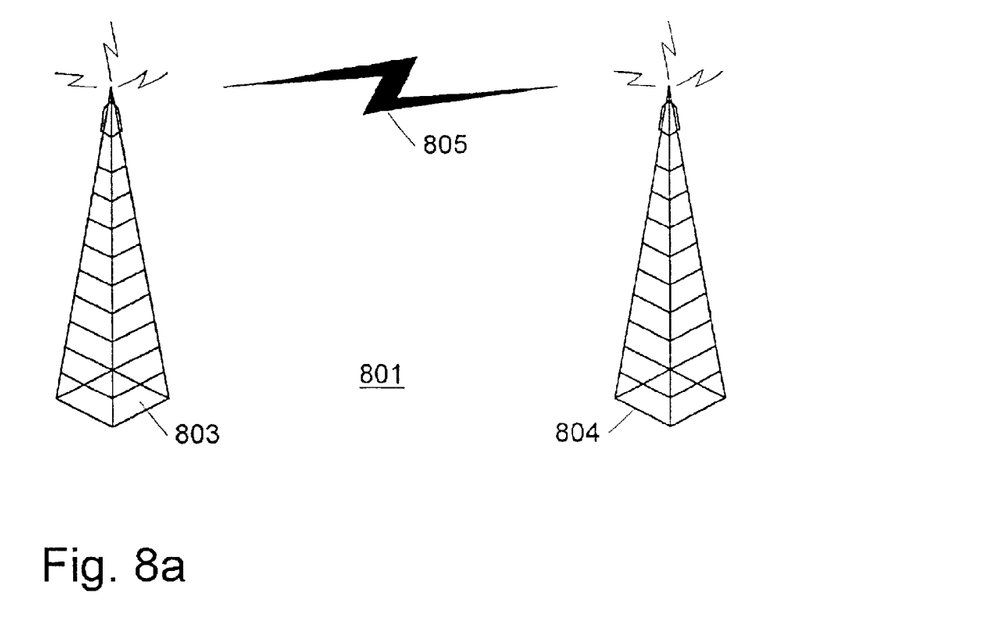
FIGS. 8a and 8b show two exemplary implementations of a system using the method and/or device according to the invention.

FIG. 8a shows a communications system (801) comprising a first transmitting/receiving station (803) and a second transmitting/receiving station (804) where information (805) may be transmitted. The PN sequences generated by the device or method according to embodiments of the present invention may be used as a subcomponent to encrypt information (805) to be transmitted between the first transmitting/receiving station (803) and the second transmitting/receiving station (804).

In this way, a safer transmission of information (805), like data, digitized speech signals, etc., may be achieved with reduced power consumption and/or reduced computational complexity.

Figure 8B:
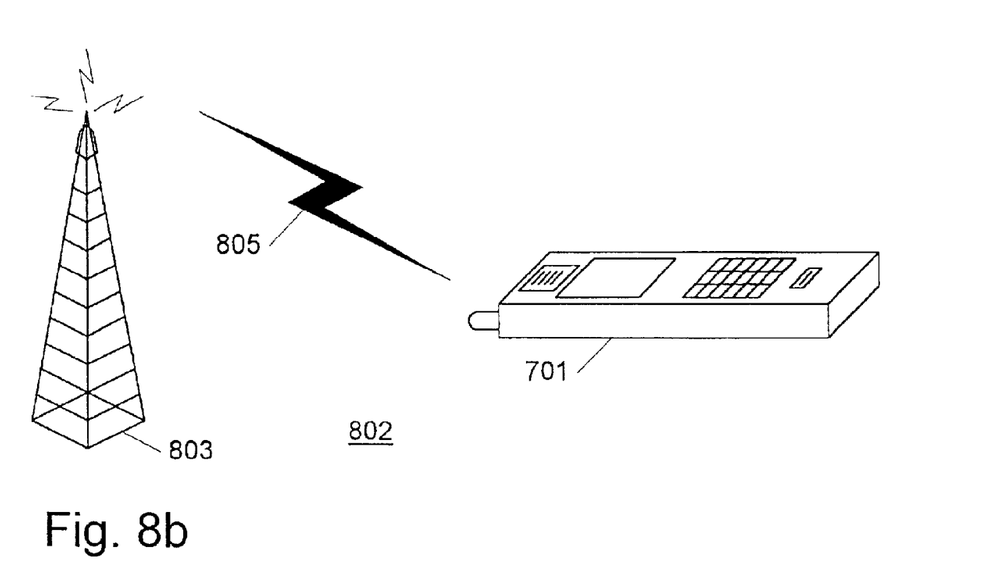

FIG. 7b shows a transmitting/receiving station (803) and a mobile terminal (701) which form a cellular communications system (802). The information (805) to be transmitted/received between the mobile terminal (701) and a network infrastructure (not shown) via the transmitting/receiving station (803) may be encrypted through the use of a ciphering system that uses PN sequences generated by clock controlled m-sequence generators.

In this way, safe transmission of information (705), like data, digitized speech signals, etc., may be achieved by using less hardware, thereby reducing the costs and power consumption.

Although various embodiments of the invention are described herein, it should be recognized that the invention maybe varied in numerous ways. Accordingly, it should be understood that the invention should be limited only insofar as is required by the scope of the following claims.

What is claimed is:

1. An electrical device for self-clocked controlled pseudo random noise (PN) sequence generation, comprising:

a plurality of sequence generator units for outputting a plurality of sequence values ($Z_t$) on the basis of a plurality of clock values ($C_t$), and step pattern generators for selecting a step pattern, comprising said plurality of clock values ($C_t$), from a plurality of possible step patterns on the basis of a step pattern select signal ($W_t$);

wherein said step pattern select signal ($W_t$) is derived on the basis of a combined value ($U_t$) and one or more previously derived step pattern select signals ($W_{t-1}$);

wherein said plurality of sequence generator units further outputs a plurality of step control values ($u_t$); and wherein said combined value ($U_t$) is provided on the basis of said plurality of step control values ($u_t$) and on the basis of a plurality of prior clock values ($C_{t-1}$).

2. An electrical device according to claim 1 wherein the number of said plurality of possible step patterns is 6, and wherein said pattern select signal ($W_t$) is derived as: $U_t + W_{t-1}$ MOD 6.

3. An electrical device according to claim 1, wherein the number of said plurality of possible step patterns is 6, and wherein said pattern select signal ($W_t$) is derived as: $U_t + a_1 W_{t-1} + a_2 W_{t-2} + a_3 W_{t-3}$ MOD 6, where $a_1$, $a_2$, and $a_3$ are pre-selected constants.

4. An electrical device according to claim 1, wherein if the number of said plurality of possible step patterns is not a prime number, then said pattern select signal ($W_t$) is derived on the basis of said combined value ($U_t$) and said previously derived step pattern select signals ($W_{t-1}$) using a Chinese remaindering technique.

5. An electrical device according to claim 1, wherein said plurality of possible step patterns includes (0,0,1,1), (0,1,0,1), (1,0,0,1), (0,1,1,0), (1,0,1,0), (1,1,0,0).

6. An electrical device according to claim 1, wherein said device further comprises a function generating unit for calculating an output value (Out$_t$) as the sum of said plurality of sequence values ($Z_t$) MOD 2.

7. An electrical device according to claim 1, wherein said plurality of sequence generator units comprise m-sequence generators.

8. An electrical device according to claim 1, wherein said device is used in a mobile telephone.

9. A method of self clock controlled pseudo random noise (PN) sequence generation, comprising the steps of:

outputting a plurality of sequence values ($Z_t$) on the basis of a plurality of clock values ($C_t$), and selecting a step pattern, providing said plurality of clock values ($C_t$), from a plurality of possible step patterns on the basis of a step pattern select signal ($W_t$);

wherein said method further comprises the steps of:

deriving said step pattern select signal ($W_t$) on the basis of a combined value ($U_t$) and one or more previously derived step pattern select signals ($W_{t-1}$);

generating a plurality of step control values ($u_t$); and providing said combined value ($U_t$) on the basis of said plurality of step control values ($u_t$) and on the basis of a plurality of prior clock values ($C_{t-1}$).

10. A method according to claim 9, wherein the number of said plurality of possible step patterns is 6, and wherein said pattern select signal ($W_t$) is derived as: $U_t + W_{t-1}$ MOD 6.

11. A method according to claim 9, wherein the number of said plurality of possible step patterns is 6, and wherein said pattern select signal ($W_t$) is derived as: $U_t + a_1 W_{t-1} + a_2 W_{t-2} + a_3 W_{t-3}$ MOD 6, where $a_1$, $a_2$, and $a_3$ are pre-selected constants.

12. A method according to claim 9, wherein said pattern select signal ($W_t$) is derived on the basis of said combined value ($U_t$) and said previously derived step pattern select signals ($W_{t-1}$) using a Chinese remaindering technique, if the number of said plurality of possible step patterns is not a prime number.

13. A method according to claim 9, wherein said plurality of possible step patterns is: (0,0,1,1), (0,1,0,1), (1,0,0,1), (0,1,1,0), (1,0,1,0), (1,1,0,0).

14. A method according to claim 9, wherein said method further comprises the step of calculating a value ($Out_t$) as the sum of said plurality of sequence values ($Z_t$) MOD 2.

15. A method according to claim 9, wherein said plurality of sequence values ($Z_t$) is generated by a plurality of m-sequence generators.

16. A method according to claim 9, wherein said method is used in a mobile telephone.

* * * * *